(12) United States Patent
Malik et al.

(10) Patent No.: US 11,032,718 B2
(45) Date of Patent: Jun. 8, 2021

(54) OPTIMIZING MILLIMETER WAVE BEAM SEARCHING

(71) Applicant: QUALCOMM Incorporated, San Diego, CA (US)

(72) Inventors: Rahul Malik, San Diego, CA (US); Tamer Adel Kadous, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/878,056

(22) Filed: Jan. 23, 2018

(65) Prior Publication Data

US 2018/0227771 A1    Aug. 9, 2018

Related U.S. Application Data

(60) Provisional application No. 62/455,356, filed on Feb. 6, 2017.

(51) Int. Cl.
| | |
|---|---|
| *H04W 16/28* | (2009.01) |
| *H04W 64/00* | (2009.01) |
| *H04B 7/06* | (2006.01) |
| *H04B 7/08* | (2006.01) |
| *H04B 7/0404* | (2017.01) |
| *H04M 15/00* | (2006.01) |
| *H04W 4/24* | (2018.01) |

(52) U.S. Cl.
CPC .......... *H04W 16/28* (2013.01); *H04B 7/0695* (2013.01); *H04B 7/086* (2013.01); *H04B 7/088* (2013.01); *H04M 15/60* (2013.01); *H04W 4/24* (2013.01); *H04W 64/006* (2013.01); *H04B 7/0404* (2013.01)

(58) Field of Classification Search
None
See application file for complete search history.

(56) References Cited

U.S. PATENT DOCUMENTS

| | | | |
|---|---|---|---|
| 8,406,806 B2 | 3/2013 | Wong | |
| 8,532,587 B2 * | 9/2013 | Lagnado | ........... H04M 1/72519 455/101 |
| 9,083,074 B2 | 7/2015 | Ayatollahi et al. | |
| (Continued) | | | |

FOREIGN PATENT DOCUMENTS

| | | |
|---|---|---|
| WO | 2015183472 A1 | 12/2015 |
| WO | 2016180497 A1 | 11/2016 |

OTHER PUBLICATIONS

Partial International Search Report—PCT/US2018/014984—ISA/EPO—dated May 8, 2018.

(Continued)

*Primary Examiner* — Marcus Smith
(74) *Attorney, Agent, or Firm* — Patterson + Sheridan, L.L.P.

(57) ABSTRACT

Certain aspects of the present disclosure relate to methods and apparatus for optimizing millimeter wave beam-searching. In certain aspects, a method for use by a wireless communications device includes determining a usage scenario of the wireless device based on input performing a beam search to maintain or establish a communication link with one or more other wireless devices, wherein one or more beams are prioritized or de-prioritized during the beam search based on the usage scenario.

25 Claims, 10 Drawing Sheets

(56) References Cited

U.S. PATENT DOCUMENTS

| | | | |
|---|---|---|---|
| 9,179,299 B2 | 11/2015 | Schlub et al. | |
| 9,344,174 B2 | 5/2016 | Ngai et al. | |
| 9,473,220 B2 | 10/2016 | Dinur et al. | |
| 2009/0115657 A1* | 5/2009 | Cheng | G01S 19/05 |
| | | | 342/357.42 |
| 2013/0040682 A1* | 2/2013 | Chang | H01Q 1/243 |
| | | | 342/368 |
| 2016/0014566 A1 | 1/2016 | Bengtsson et al. | |
| 2016/0044463 A1* | 2/2016 | Lee | H04W 4/023 |
| | | | 455/456.1 |
| 2016/0094939 A1* | 3/2016 | Guy | H04W 52/0254 |
| | | | 455/456.2 |
| 2016/0323898 A1* | 11/2016 | Jo | H04B 7/0617 |
| 2016/0329943 A1 | 11/2016 | Selén et al. | |
| 2016/0365886 A1* | 12/2016 | Prendergast | H04W 52/367 |
| 2018/0109303 A1* | 4/2018 | Yoo | H04B 7/0695 |
| 2018/0191422 A1* | 7/2018 | Xia | H04B 7/0834 |
| 2019/0074879 A1* | 3/2019 | Furuskog | H04B 7/0456 |
| 2019/0115657 A1 | 4/2019 | Hwang et al. | |

OTHER PUBLICATIONS

International Search Report and Written Opinion—PCT/US2018/014984—ISA/EPO—dated Sep. 19, 2018.

\* cited by examiner

OPTIMIZING MILLIMETER WAVE BEAM SEARCHING

CROSS-REFERENCE TO RELATED APPLICATIONS

This application claims the benefit of U.S. Application Ser. No. 62/455,356 entitled "OPTIMIZING MILLIMETER WAVE BEAM SEARCHING," which was filed Feb. 6, 2017. The aforementioned application is herein incorporated by reference in its entirety.

FIELD

The present disclosure relates generally to communication systems, and more particularly, to methods and apparatus for optimizing millimeter wave beam searching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a wireless device. The method generally includes determining a usage scenario of the wireless device based on input and performing a beam search to maintain or establish a communication link with one or more other wireless devices, wherein one or more beams are prioritized or de-prioritized during the beam search based on the usage scenario.

Certain aspects provide an apparatus comprising a number of antenna arrays and a processor configured to perform the method described above.

Certain aspects provide an apparatus comprising means for performing the method described above.

Certain aspects provide a non-transitory computer readable medium having instructions stored thereon for performing the method described above.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
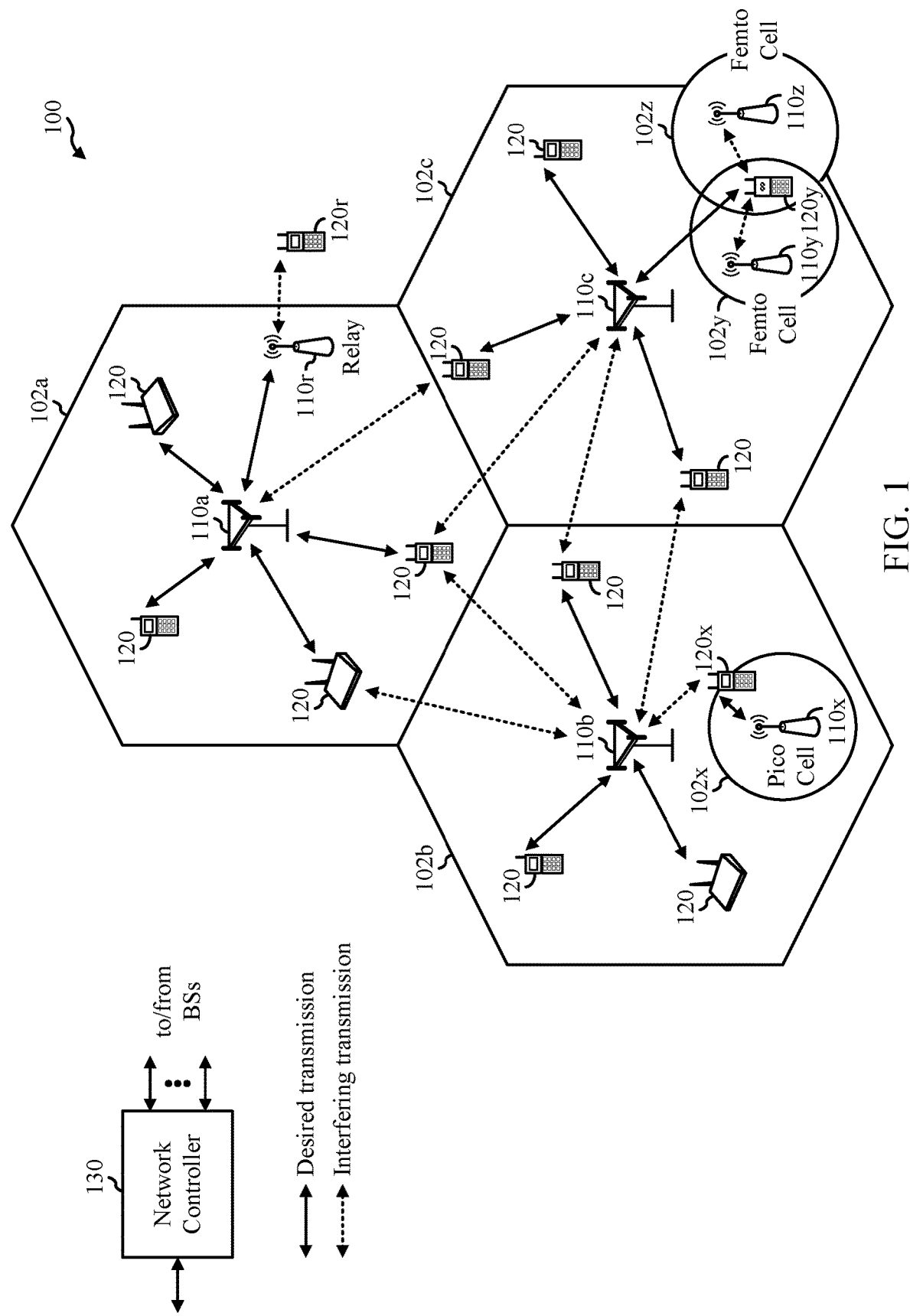
FIG. 1 is a block diagram conceptually illustrating an example telecommunications system, in accordance with certain aspects of the present disclosure.

Aspects of the present disclosure relate to methods and apparatus for use by a wireless device in optimizing millimeter wave beam-searching.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

As described below, in order to find an optimal transmit and/or receive beam to establish and/or maintain a good communications link, beam searching may be performed by a wireless communications device (e.g., UE 120, BS 110, etc.). As the number of antenna elements increases, the number of beams to consider during a search grows as well. As a result, a beam search may result in substantial latency, which may increase the amount of time to establish a link and/or decrease data throughput. Performing a search also results in substantial power consumption. Aspects of the present disclosure, however, help optimize a beam search procedure, for example, by allowing a device to search in likely places for a beam. By prioritizing (and/or de-prioritizing) beams during a search, latency and/or power consumption are reduced. For example, a wireless communications device may be a cellular phone that may be held in different ways by a user based on the usage scenario. As a result, based on the usage scenario, one or more antenna arrays of the wireless communications device may be occluded or the wireless device may be oriented in a certain way. In certain embodiments, the wireless communications device (e.g., a modem therein) may receive input about the occlusion of one or more antennas and/or the orientation of the device, determine the wireless device's usage scenario, and, accordingly, prioritize or deprioritize certain beams to optimize its beam searching.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
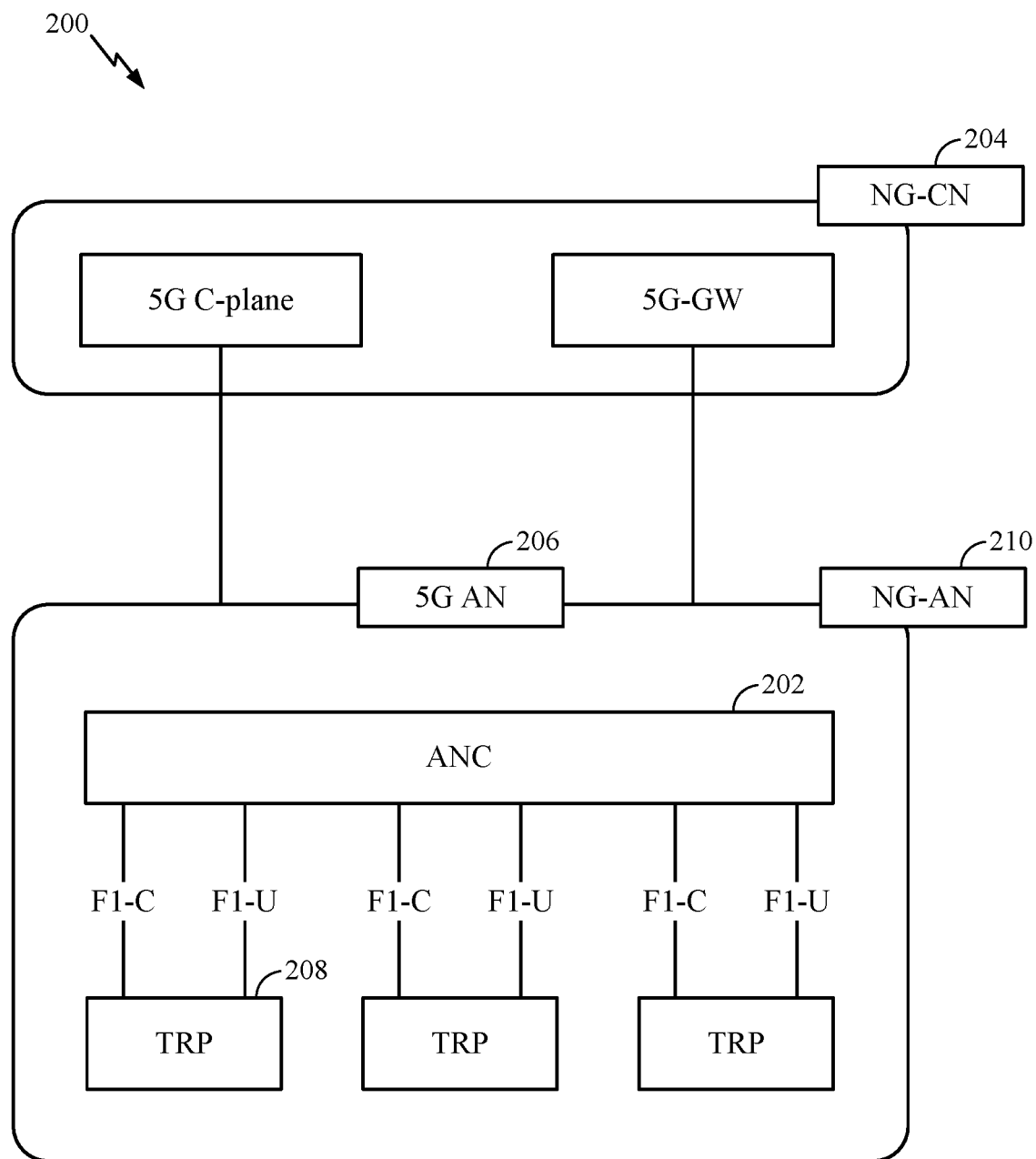
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
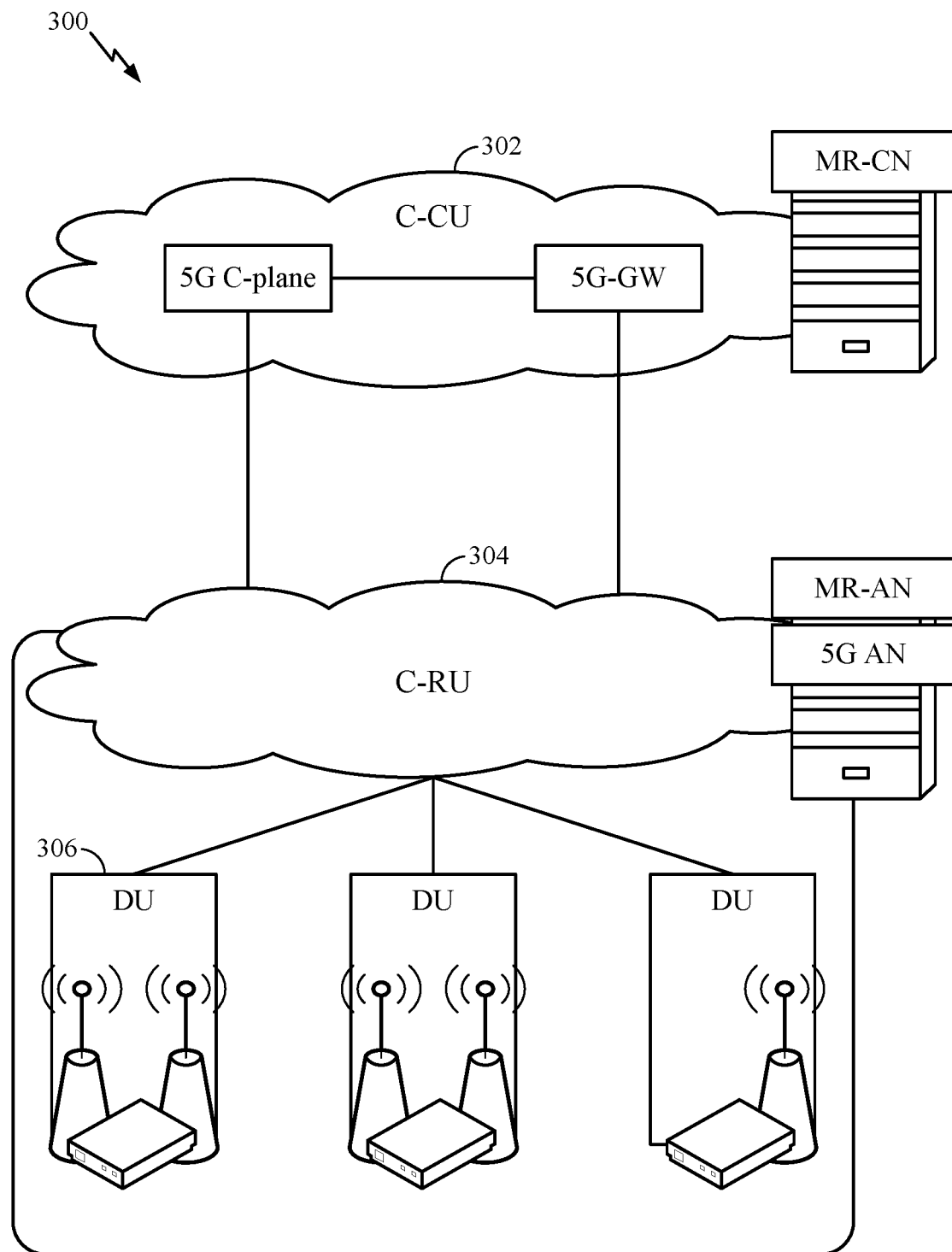
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
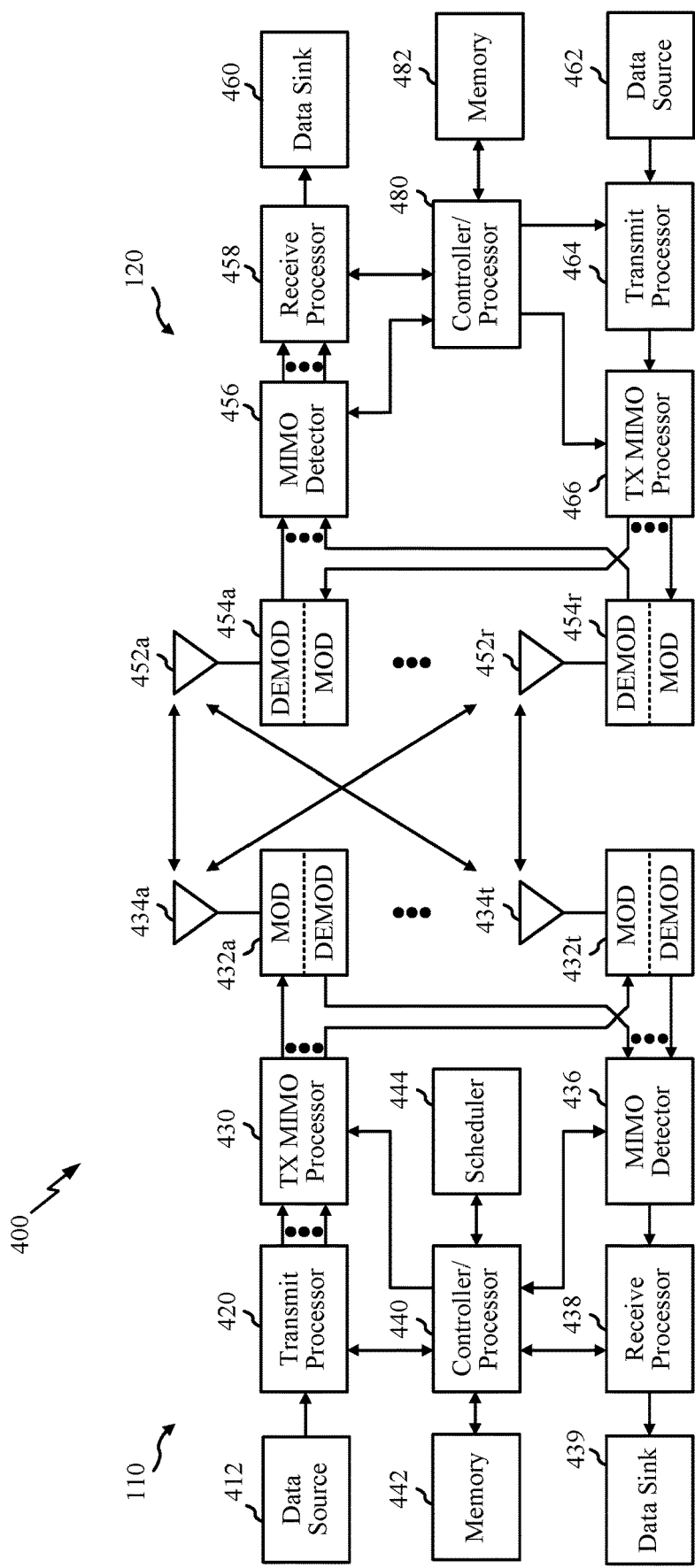
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
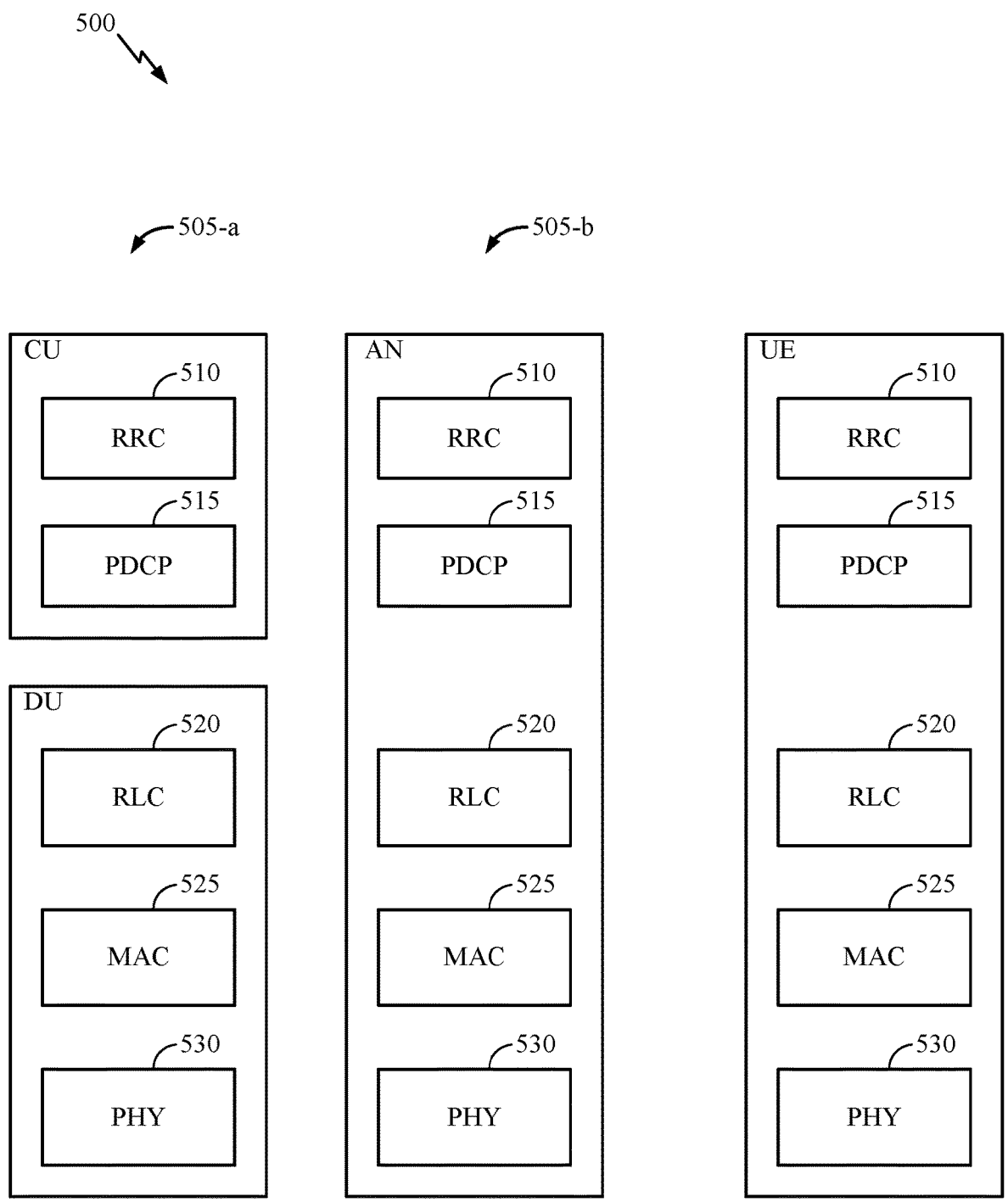
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
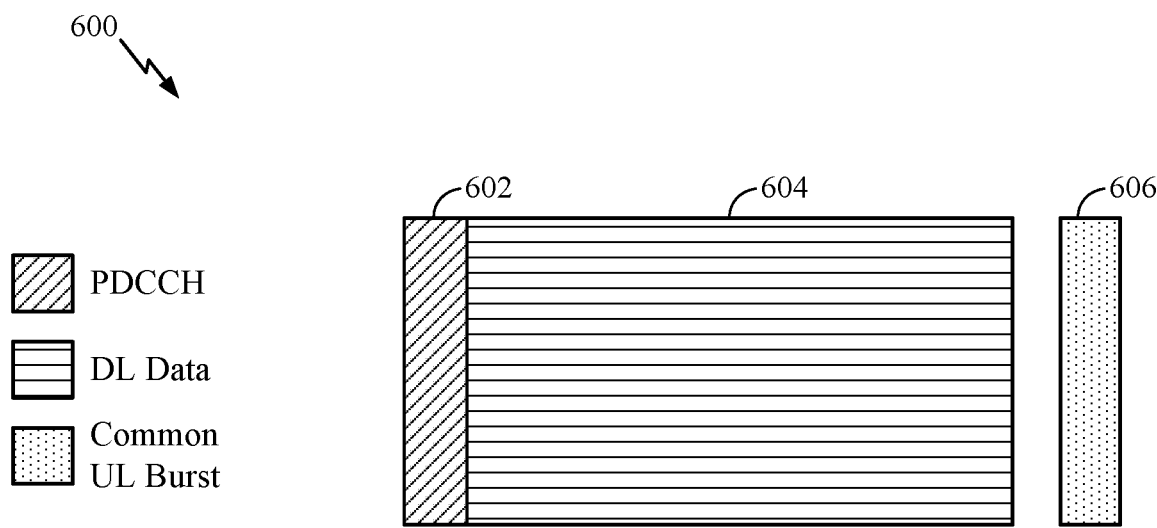
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
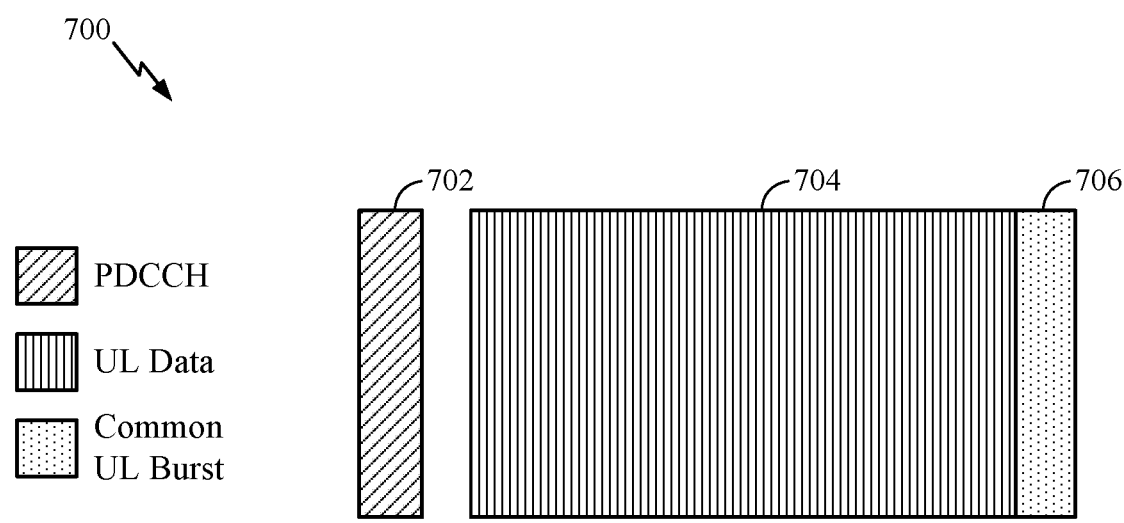
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beamforming Training

Figure 8:
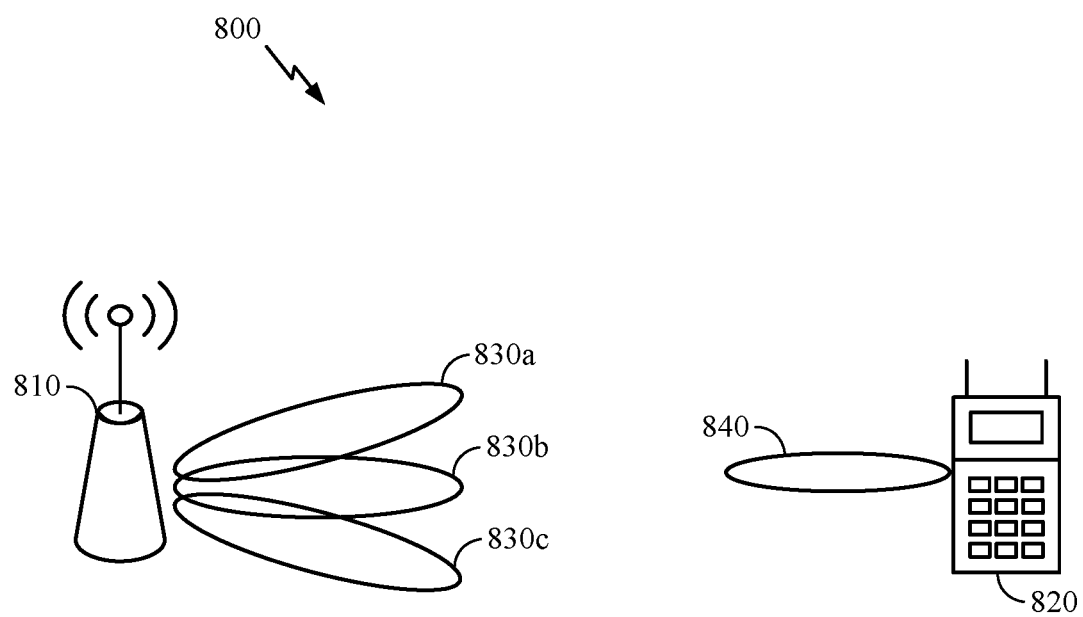
FIG. 8 illustrates an exemplary wireless communications system, in accordance with aspects of the present disclosure.

FIG. 8 illustrates an exemplary wireless communications system 800, in accordance with certain aspects of the present disclosure. Wireless communications system 800 includes access point (AP) 810 and UE 820. As described above, to achieve high directional gain, the beam of the transmitter (e.g. AP) and a receiver (e.g. a UE) have to be aligned precisely. For example, one of beams 830a through 830c propagated by the transmitter (e.g. AP 810) must intercept beam 840 propagated by the receiver (e.g. UE 920), or vice versa. The process of aligning beams propagated by the transmitter and the receiver is generally referred to as beamforming training.

The BF process is typically employed by a pair of millimeter-wave stations, e.g., a receiver and a transmitter. Each pairing of the stations achieves the necessary link budget for subsequent communication among those network devices. As such, BF training is a bidirectional sequence of BF training frame transmissions that uses sector sweep and provides the necessary signals to allow each station to determine appropriate antenna system settings for both transmission and reception. After the successful completion of BF training, a millimeter-wave communication link is established.

A beamforming training procedure helps address problems related to high path loss experienced for communications in the millimeter-wave spectrum by allowing for increased antenna gain, as described above. As such, a large number of antennas are placed at each transceiver to exploit the beamforming gain for extending communication range. That is, the same signal is sent from each antenna in an array, but at slightly different times. In some embodiments, a UE (or a base station) may have a large number of antenna arrays installed on some or all if its faces (or sides).

In some embodiments, the BF procedure includes three phases. These phases may include, for example, a sector level sweep (SLS) phase to select a transmit antenna, a beam refinement phase to train transmit and receive antennas, and a beam tracking phase to adjust for changing channel conditions.

In the SLS phase, one of the STAs acts as an initiator by conducting an initiator sector sweep, which is followed by a transmit sector sweep by the responding station (where the responding station conducts a responder sector sweep). A sector is either a transmit antenna pattern or a receive antenna pattern corresponding to a sector ID. As mentioned above, a station may be a transceiver that includes one or more active antennas in an antenna array (e.g., a phased antenna array).

During the SLS phase, each transceiver of the initiator station and of the responding station is configured for conducting a receiver sector sweep (RXSS) reception of sector sweep (SSW) frames via different sectors, in which a sweep is performed between consecutive receptions and a transmission of multiple sector sweeps (SSW) (TXSS) or directional Multi-gigabit (DMG) beacon frames via different sectors, in which a sweep is performed between consecutive transmissions.

The initiator station performs a sector sweep by sending a set of training frames for each sector to be trained to the responding station. The responding station likewise performs a sector sweep by sending a set of training frames to the initiator station. Sector sweep feedback information is then exchanged between the initiator and responding stations allowing each station to determine which sector is their best transmit sector. The SLS phase typically concludes after an initiating station receives sector sweep feedback and sends a sector acknowledgement (ACK), thereby establishing a beam form.

During the beam refinement phase, each station can sweep a sequence of transmissions, separated by a short beamforming interframe space (SBIFS) interval, in which the antenna configuration at the transmitter or receiver can be changed between transmissions. For example, an initiator may sweep a sequence of transmissions while a responding station adjusts its antenna configuration, for example by adjusting antenna weight vector based on the initiator station's sweep sequence, to determine an optimal antenna configuration. The responding station may then transmit its own sweep, allowing the initiator station to adjust its antenna configuration based on the responding station's sweep sequence. Thus beam refinement allows a station to improve its antenna configuration (or antenna weight vector) both for transmission and reception. Each antenna may have an antenna weight vector (AWV), which further includes a vector of weights describing the excitation (amplitude and/or phase) for each element of an antenna array.

Example Optimizing Millimeter Wave Beam Searching

Millimeter wave (mmW) bands are being considered for 5G communications as they provide a large amount of bandwidth with potential for spatial re-use. However, as compared to operating in lower frequencies, mmW bands have high atmospheric attenuation and are subject to higher levels of absorption by atmospheric gases, rain, objects, etc., resulting in higher free space loss. But, due to the smaller wavelengths in mmW bands, antenna elements can be closely packed to form high-gain directional antenna arrays that can compensate for the high path loss. These phased antenna arrays can be used at each transmitter and receiver to create narrow beams and focus the signal energy towards a specific direction.

In order to establish and/or maintain a good communications link, a beam search may be performed to find an optimal transmit and/or receive beam (or pair). As the number of antenna elements increases, the number of beams to consider during a search grows as well. As a result, a beam search may result in substantial latency, which may increase the amount of time to establish a link and/or decrease data throughput. Performing a search also results in substantial power consumption.

Aspects of the present disclosure, however, may help optimize a beam search procedure, for example, by allowing a device to search in likely places for a beam. By prioritizing (and/or de-prioritizing) beams during a search, latency and/or power consumption may be reduced.

As noted above, beam tracking may be performed in conjunction with data transmissions. For example, training fields may be appended/pre-pended to data packets or transmitted occasionally between data packets. These training fields may then be measured and used to make adjustments for further transmissions.

Both mmW beam-searching (SLS phase) and beam refinement/tracking may present various challenges. In some situations, the beamforming stages may take place while there is mobility, occlusion, changes in the orientation of one or both of the STAs, or changes in frequency channels. In such situations, beam-searching to establish a link between the STAs as well as maintaining it may lead to latency, waste of resources, and/or unnecessary power consumption. As an example, in some embodiments, a UE may be a hand-held wireless device, which may engage in beamforming with an access point (AP). As described above, in some embodiments, the UE may have a large number of phased antenna arrays on some or all of its sides, which may all be activated during the beamforming process. However, the UE may be held in a user's hand while the UE is engaged with beam-searching and, therefore, the user's hand may be blocking some of the antennas on one or more sides of the UE, while those blocked antennas are consuming power and wasting time by continuing to search for beams.

In another example, the UE may be oriented in a certain way such that some of the UE antennas may be facing the opposite direction relative to the AP. However, these antennas may continue to engage in beam-searching, which, as described above, may result in a waste of power and resources and also latency.

Figure 9:
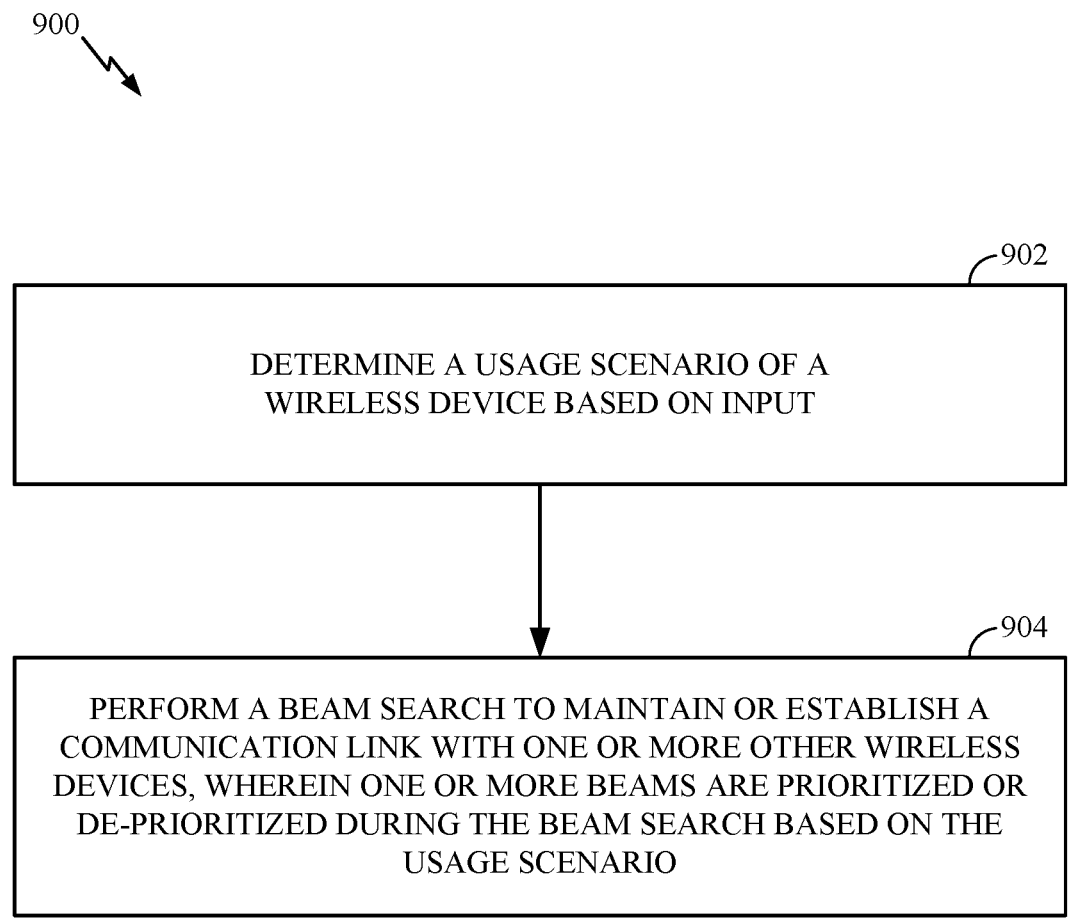
FIG. 9 illustrates example operations for wireless communications by a user equipment, in accordance with aspects of the present disclosure.

FIG. 9 illustrates example operations 900 for wireless communications by a wireless device, according to aspects of the present disclosure. The wireless device performing operation 900 may be, for example, a user equipment and/or an access point, in some embodiments. Operations 900 begin, at 902, by determining a usage scenario of the wireless device based on input. At 904, operations 900 continue by performing a beam search to maintain or establish a communication link with one or more other wireless devices, wherein one or more beams are prioritized or de-prioritized during the beam search based on the usage scenario.

Figure 10:
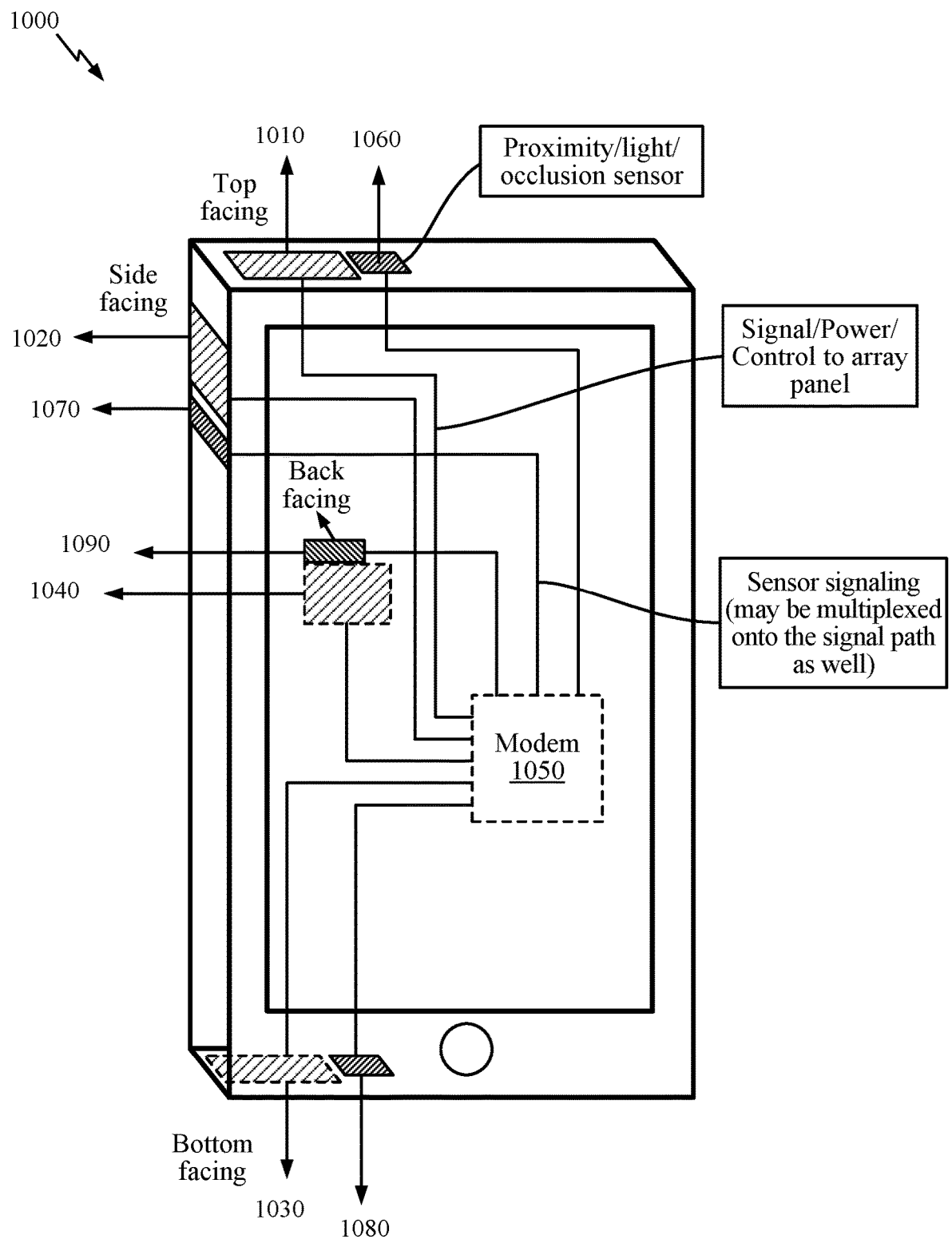
FIG. 10 illustrates example wireless device, in accordance with aspects of the present disclosure.

FIG. 10 illustrates an exemplary wireless device 1000, in accordance with certain aspects of the present disclosure. In some embodiments, wireless device 1000 may be a UE and, in other embodiments, the wireless device may be an AP/eNB/BS. For example, wireless device 1000 may be a hand-held UE capable of performing beamforming using a large number of antenna arrays. As described above, in some embodiments, the antennas may be located on one or more sides of the UE. FIG. 10 shows, for example, top facing antennas 1010, side facing antennas 1020, bottom facing antennas 1030, and back facing antennas 1040 communicating with modem 1050. FIG. 10 also illustrates one or more sensors located close to each set of antennas 1010-1040. For example, FIG. 10 shows one or more sensors 1060 located close to antennas 1010. In addition to the antennas (e.g., antennas 1010-1040), sensors (e.g., sensors 1060-1090), and modem (e.g., modem 1050) shown in FIG. 10, some embodiments, the UE may include a processor, memory, housing, transmitter, receiver, signal detector, digital signal processor (DSP), and a system bus (not shown). The processor controls the operation of the UE and may also be referred to as a central processing unit (CPU). The memory, which may include both read-only memory (ROM) and random access memory (RAM), provides instructions and data to the processor. A portion of the memory may also include non-volatile random access memory (NVRAM). The processor typically performs logical and arithmetic operations based on program instructions stored within the memory. The instructions in the memory may be executable to implement the methods described herein. The processor may, for example, perform or direct some or all of the methods and processes described herein.

The UE's housing may include the transmitter and the receiver to allow transmission and reception of data between the UE and a remote location, such as a base station. The transmitter and receiver may be combined into a transceiver. A single or a plurality of transmit and receive antennas (e.g., antennas 1010-1040) may be attached to the housing, as described above and shown in FIG. 10, and electrically coupled to the transceiver. The UE may also include multiple transmitters, multiple receivers, and multiple transceivers.

The signal detector may be used in an effort to detect and quantify the level of signals received by the transceiver. The signal detector may detect such signals as total energy, energy per subcarrier per symbol, power spectral density and other signals. The UE may also use the DSP for processing signals. The various components of the UE may be coupled together by the system bus, which may include a power bus, a control signal bus, and a status signal bus in addition to a data bus.

As described above, in some embodiments, the UE may be a cellular phone that may be held in different ways by a user. In some embodiments, the manner by which the UE is held changes depending on the usage scenario (i.e., why the UE is being used by the user). For instance, the user may hold the UE in a vertical manner, horizontal manner, etc. In some embodiments, one or more of the antennas may be blocked by the user (e.g., the user's hand etc.) depending on the usage scenario. As discussed above, this may raise challenges because the human body (e.g., hands) greatly attenuates mmW signals resulting in a disruption of the beamforming process.

Accordingly, certain embodiments described herein relate to optimizing mmW beam-searching by embedding one or more sensors (e.g., sensors 1060-1090) on each of the phased antenna arrays. In some embodiments, these sensors may be proximity sensors, capacitive sensors, and/or light sensors, etc. and may be either located on one or more antenna arrays or be integrated in wireless device 1000, as shown in FIG. 10. In certain embodiments, the sensors located on or next to an antenna array may determine whether the antenna array is being occluded or obstructed by the user. For instance, if a user is holding the UE in a vertical manner, the user's hand may be covering the back of the UE thus blocking the back-facing antenna arrays (e.g., antennas 1040). In such an example, the sensors (e.g., sensors 1060-1090) located on or next to the blocked arrays may communicate the blockage to the modem. The modem may then prioritize its beam searching to maintain or establish a communication link with one or more wireless devices.

That is, based on the input received from the sensors, the modem (e.g., model 1050) may prioritize beams received/propagated by arrays that are not occluded over the arrays that are occluded. In such embodiments, the modem may even exclude beams received/propagated by blocked arrays from the search. In some other embodiments, the modem may prioritize by first performing beam-searching using the non-blocked arrays and then using the blocked arrays if the modem was not successful in beam-searching using the non-blocked arrays. It is important to note that, in some embodiments, this prioritization mechanism may be performed in both transmission and reception of beams during the beam-searching process.

In some embodiments, wireless device 1000 may be a UE running an application using its processing units, memory etc. In such embodiments, in addition to or instead of the input received from the sensors, the modem may receive input relating to the UE's usage scenario from the application running on the UE. For instance, the processing units included in the UE may be executing a user application, such as a car racing game. In such an example, the user may be directing the virtual vehicle in the game by holding or orienting the UE in certain manners. In some embodiments, the gaming application may then be configured to send information about the manner by which the UE is being held, or its orientation, to the processing units of the UE (e.g., through the operating system being run by the processing units or via direct hardware interconnect to achieve real time performance). This information may then be stored in the processing units' registers, which may then be accessed by the modem (e.g., modem 1050) to make prioritization decisions, as described above. Accordingly, in some embodiments, the input received from the sensors may be bolstered by the information received from the user application regarding the usage scenario.

In addition to the occlusion of certain antenna arrays due to various holding manners, a wireless device (e.g., UE) may engage in inefficient and ineffective beam searching due to its orientation. For instance, because the main mmW propagation modes are LOS (i.e., line of sight) and reflection, in some embodiments, it is less likely that signals being sent to a wireless device (e.g., UE) are received from below the wireless device (e.g., emanating/reflected by the floor).

Accordingly, certain embodiments described herein relate to optimizing mmW beam-searching by embedding one or more sensors in the wireless device. As described above, these sensors (e.g., gyroscopes etc.) may be located on one or more antenna arrays or be integrated in wireless device 1000, as shown in FIG. 10. As described above, in some embodiments, the sensors may recognize the orientation of the wireless device relative to one or more other devices. Similar to occlusion, orientation of a wireless device may change depending on its usage scenario. For example, in embodiments where the wireless device is a UE, a user may put the UE on a table while looking at pictures saved on the UE. In such an example, the sensors embedded within the UE may send an input to the modem relating to the orientation of the UE.

Having received the input, in some embodiments, the modem may then deprioritize beams or antenna arrays that are downward facing and prioritize beams or antenna arrays that are upward facing in the overall beam-search. In such embodiments, the modem may even exclude beams received/propagated by the downward facing arrays from the search. In some other embodiments, the modem may prioritize by first performing beam-searching using the upward and/or sideways facing arrays and then using the downward facing arrays if the modem was not successful in beam-searching using the upward facing arrays. As described above, it is important to note that, in some embodiments, this prioritization mechanism may be performed in both transmission and reception of beams during the beam-searching process.

Also, as described above, in some embodiments, in addition to or instead of the input received from the sensors, the wireless device may run a user application capable of sending information to the processing units regarding the usage scenario. For instance, the user application may be virtual reality gaming application that requires the wireless device to be placed in a VR headset such that the wireless device is facing downwards. In such embodiments, this information may be used to augment the information received from the sensors. In some embodiments, sensor information may not be available at all, in which case only the input received from the user application may be used by the modem to make prioritization decisions.

Figure 11:
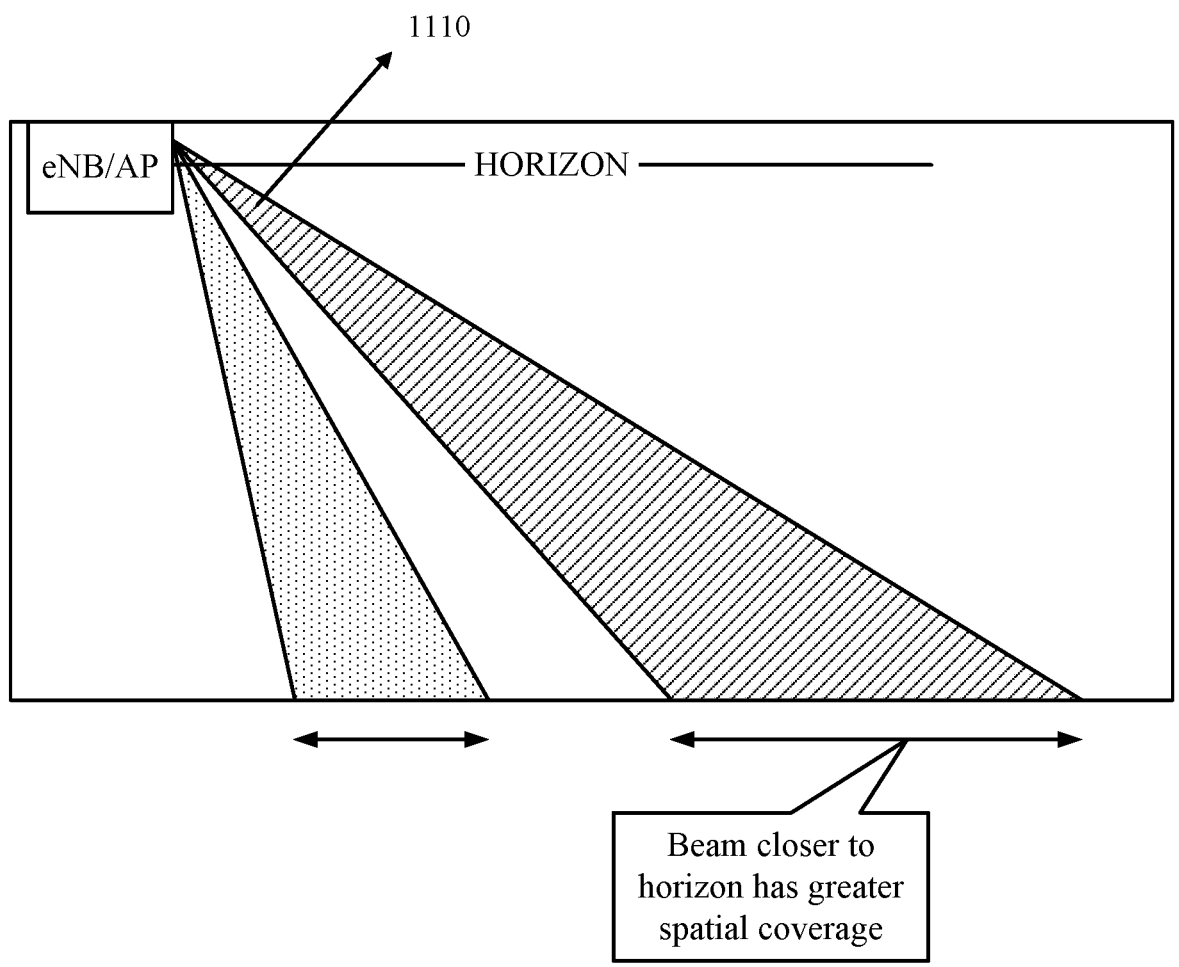
FIG. 11 illustrates example wireless device and its spatial coverage, in accordance with aspects of the present disclosure.

As described above, the main mmW propagation modes are LOS and reflection. In some embodiments, this is especially true in indoor environments, where beams are more likely to be directed to/from the walls ceilings. In such embodiments, a wireless device (e.g. UE, AP/eNB/BS etc.) with an orientation closer to the horizon may enable a larger spatial coverage and thus enable finding the correct beam in a more effective and efficient manner. FIG. 11, for instance, illustrates an AP propagating beams in two different orientations. Although both beams have the same angular diameter, the beam with an orientation closer to the horizon (i.e., beam 1110) is enabling a larger spatial coverage.

Accordingly, in some embodiments, after receiving input from the sensors or a user application regarding the wireless device's orientation, antenna arrays or beams that are closer to the horizon may be prioritized in the beam-search. In some embodiments, which antenna arrays or beams are prioritized or deprioritize may also depend on whether the wireless device is a UE or an AP. For instance, if the wireless device is an AP, it is likely located at a higher elevation relative to other wireless devices (e.g. UEs). In such an example, the wireless device acting as an AP, or the like, may be configured to prioritize beams that are near and below the horizon as shown in FIG. 11. This prioritization, in some embodiments, may mean that the AP may start its beam-searching with beams that are near and below the horizon and then work its way towards the opposite direction. This prioritization mechanism, in some embodiments, may enable the AP to potentially complete its beam-search faster because the search is being focused on spatial areas that are more likely to include the beam of choice.

In some embodiments, this prioritization configuration may be configured manually. For example, a wireless device that is determined to function as an AP and be placed at an elevation, may be manually configured to prioritize beams near or below the horizon, with the expectation or assumption that the wireless device is placed at an elevation in comparison to the other wireless devices (e.g. UEs). In some embodiments, however, information about the elevation of the wireless device may be self-detected. For instance, the AP may have sensors providing information about its elevation and fixed location, based on which the AP may then prioritize its beams.

In embodiments, where the wireless device is a UE, however, beams that are near and above the horizon may be prioritized instead. This prioritization, in some embodiments, may mean that the UE may start its beam-searching with beams that are near and above the horizon and then work its way towards the opposite direction. This prioritization mechanism, in some embodiments, may enable the UE to potentially complete its beam-search faster because the search is being focused on spatial areas that are more likely to include the beam of choice. In some embodiments, this prioritization configuration may be set in a similar manner to an AP, as described above.

Although the embodiments above were described in relation to mmW bands in used in 5G, the embodiments may similarly apply to 802.11[80], 802.11ay, and other WLAN standards.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a wireless device, comprising:
   determining that one or more of a number of antenna arrays of the wireless device are occluded based on input, wherein one or more first beams are associated with the one or more of the number of antenna arrays that are determined to be occluded, and wherein one or more second beams are not associated with the one or more of the number of antenna arrays that are determined to be occluded; and
   performing a beam search to maintain or establish a communication link with one or more other wireless devices, wherein the one or more first beams are de-prioritized during the beam search based on the one or more first beams being associated with the one or more of the number of antenna arrays that are determined to be occluded, wherein the one or more second beams are prioritized during the beam search based on the one or more second beams not being associated with the one or more of the number of antenna arrays that are determined to be occluded, and wherein performing the beam search comprises:
      performing the beam search over the one or more second beams based on the one or more second beams being prioritized; and
      when the beam search over the one or more second beams is unsuccessful, performing the beam search over the one or more first beams based on the one or more first beams being de-prioritized.

2. The method of claim 1, wherein the input is at least in part generated by one or more sensors located on or integrated in the wireless device.

3. The method of claim 1, wherein the input indicates a manner by which the wireless device is held by a user.

4. The method of claim 1, wherein the input indicates an orientation of the wireless device relative to the one or more other wireless devices.

5. The method of claim 4, wherein the one or more first beams comprise one or more downward facing beams of the number of antenna arrays, based on the orientation.

6. The method of claim 1, wherein the input comes from an application running on the wireless device.

7. An apparatus for wireless communications comprising:
   a number of antenna arrays; and
   a processor configured to:
      determine that one or more of the number of antenna arrays are occluded based on input, wherein one or more first beams are associated with the one or more of the number of antenna arrays that are determined to be occluded, and wherein one or more second beams are not associated with the one or more of the number of antenna arrays that are determined to be occluded; and
      perform a beam search to maintain or establish a communication link with one or more other wireless devices, wherein the one or more first beams are de-prioritized during the beam search based on the one or more first beams being associated with the one or more of the number of antenna arrays that are determined to be occluded, wherein the one or more second beams are prioritized during the beam search based on the one or more second beams not being associated with the one or more of the number of antenna arrays that are determined to be occluded, and wherein to perform the beam search comprises to:
  perform the beam search over the one or more second beams based on the one or more second beams being prioritized; and
  when the beam search over the one or more second beams is unsuccessful, perform the beam search over the one or more first beams based on the one or more first beams being de-prioritized.

8. The apparatus of claim 7, further comprising:
one or more sensors, wherein the one or more sensors are located on the apparatus or integrated within the apparatus.

9. The apparatus of claim 8, wherein the input is at least in part generated by the one or more sensors.

10. The apparatus of claim 7, wherein the input indicates a manner by which the apparatus is held by a user.

11. The apparatus of claim 7, wherein the input indicates an orientation of the apparatus relative to the one or more other wireless devices.

12. The apparatus of claim 11, wherein the one or more first beams comprise one or more downward facing beams of the number of antenna arrays, based on the orientation.

13. The apparatus of claim 7, wherein the input comes from an application running on the apparatus.

14. An apparatus for wireless communications, comprising:
  means for determining that one or more of a number of antenna arrays of the apparatus are occluded based on input, wherein one or more first beams are associated with the one or more of the number of antenna arrays that are determined to be occluded, and wherein one or more second beams are not associated with the one or more of the number of antenna arrays that are determined to be occluded; and
  means for performing a beam search to maintain or establish a communication link with one or more other wireless devices, wherein the one or more first beams are de-prioritized during the beam search based on the one or more first beams being associated with the one or more of the number of antenna arrays that are determined to be occluded, wherein the one or more second beams are prioritized during the beam search based on the one or more second beams not being associated with the one or more of the number of antenna arrays that are determined to be occluded, and wherein performing the beam search comprises:
    performing the beam search over the one or more second beams based on the one or more second beams being prioritized; and
    when the beam search over the one or more second beams is unsuccessful, performing the beam search over the one or more first beams based on the one or more first beams being de-prioritized.

15. The apparatus of claim 14, wherein the input is at least in part generated by one or more sensors located on or integrated in the apparatus.

16. The apparatus of claim 14, wherein the input indicates a manner by which the apparatus is held by a user.

17. The apparatus of claim 14, wherein the input indicates an orientation of the apparatus relative to the one or more other wireless devices.

18. The apparatus of claim 17, wherein the one or more first beams comprise one or more downward facing beams of the number of antenna arrays, based on the orientation.

19. The apparatus of claim 14, wherein the input comes from an application running on the apparatus.

20. A non-transitory computer readable medium having instructions stored thereon that, when executed by a wireless device, cause the wireless device to perform a method comprising:
  determining that one or more of a number of antenna arrays of the wireless device are occluded based on input, wherein one or more first beams are associated with the one or more of the number of antenna arrays that are determined to be occluded, and wherein one or more second beams are not associated with the one or more of the number of antenna arrays that are determined to be occluded; and
  performing a beam search to maintain or establish a communication link with one or more other wireless devices, wherein the one or more first beams are de-prioritized during the beam search based on the one or more first beams being associated with the one or more of the number of antenna arrays that are determined to be occluded, wherein the one or more second beams are prioritized during the beam search based on the one or more second beams not being associated with the one or more of the number of antenna arrays that are determined to be occluded, and wherein performing the beam search comprises:
    performing the beam search over the one or more second beams based on the one or more second beams being prioritized; and
    when the beam search over the one or more second beams is unsuccessful, performing the beam search over the one or more first beams based on the one or more first beams being de-prioritized.

21. The non-transitory computer readable medium of claim 20, wherein the input is at least in part generated by one or more sensors located on or integrated in the wireless device.

22. The non-transitory computer readable medium of claim 20, wherein the input indicates a manner by which the wireless device is held by a user.

23. The non-transitory computer readable medium of claim 20, wherein the input indicates an orientation of the wireless device relative to the one or more other wireless devices.

24. The non-transitory computer readable medium of claim 23, wherein the one or more first beams comprise one or more downward facing beams of the number of antenna arrays, based on the orientation.

25. The non-transitory computer readable medium of claim 20, wherein the input comes from an application running on the wireless device.

* * * * *